(12) United States Patent
Murray et al.

(10) Patent No.: US 12,147,538 B2
(45) Date of Patent: Nov. 19, 2024

(54) STEGANOGRAPHIC MODIFICATION DETECTION AND MITIGATION FOR ENHANCED ENTERPRISE SECURITY

(71) Applicant: Bank of America Corporation, Charlotte, NC (US)

(72) Inventors: Matthew Murray, Roanoke, TX (US); Garrett Botkin, Charlotte, NC (US); Dustin Stocks, Stallings, NC (US)

(*) Notice: Subject to any disclaimer, the term of this patent is extended or adjusted under 35 U.S.C. 154(b) by 317 days.

(21) Appl. No.: 17/872,354

(22) Filed: Jul. 25, 2022

(65) Prior Publication Data
US 2024/0028727 A1 Jan. 25, 2024

(51) Int. Cl.
G06F 21/53 (2013.01)
G06F 21/56 (2013.01)
G06T 1/00 (2006.01)
G06T 7/90 (2017.01)

(52) U.S. Cl.
CPC ............ G06F 21/568 (2013.01); G06F 21/53 (2013.01); G06F 21/566 (2013.01); G06T 7/90 (2017.01); *G06T 2207/10024* (2013.01)

(58) Field of Classification Search
CPC ...... G06F 21/568; G06F 21/53; G06F 21/566; G06T 7/90; G06T 2207/10024
USPC ......................................................... 726/22
See application file for complete search history.

(56) References Cited

U.S. PATENT DOCUMENTS

| | | | | |
|---|---|---|---|---|
| 5,613,004 A * | 3/1997 | Cooperman | ..... | H04N 21/23892 713/176 |
| 6,831,991 B2 * | 12/2004 | Fridrich | ..... | G06T 1/005 382/100 |
| 7,970,166 B2 * | 6/2011 | Carr | ..... | G06T 1/0064 382/100 |
| 8,745,742 B1 * | 6/2014 | Satish | ..... | G06F 7/00 380/232 |
| 9,647,846 B1 * | 5/2017 | Schulman | ..... | G06F 21/56 |
| 10,270,790 B1 * | 4/2019 | Jackson | ..... | H04L 63/1425 |
| 10,360,354 B1 | 7/2019 | Easttom | | |
| 10,366,165 B2 | 7/2019 | Devkar et al. | | |
| 10,366,222 B2 * | 7/2019 | Daly | ..... | H04W 12/068 |
| 10,467,208 B1 | 11/2019 | Easttom | | |
| 10,489,874 B2 | 11/2019 | Chandorkar | | |
| 10,491,574 B1 | 11/2019 | Jung et al. | | |

(Continued)

OTHER PUBLICATIONS

Shadi Elshare; Modified Multi-Level Steganography to Enhance data security; Researchgate: year:2018; pp. 509-525.*

*Primary Examiner* — Monjur Rahim
(74) *Attorney, Agent, or Firm* — Banner & Witcoff, Ltd.

(57) ABSTRACT

Aspects of the disclosure relate to mitigation and detection of steganographic modifications embedded in images. A computing platform may receive an image embedded with steganographic modifications. The computing platform may change or modify any number of bits of one or more color components of one or more pixels of an image, rendering the steganographic modifications ineffective. The computing platform may cause at an isolation zone system, execution of an image, including steganographic modifications, to identify images embedded with steganographic modifications. The computing platform may also compare an image with image stored in an image storage module. The computing platform may store an image from the image storage module with a highest visual comparison score rather than the image.

20 Claims, 11 Drawing Sheets

(56) References Cited

U.S. PATENT DOCUMENTS

| | | | |
|---|---|---|---|
| 10,560,599 B2 | 2/2020 | Holub et al. | |
| 10,586,055 B2* | 3/2020 | Boutnaru | G06F 21/602 |
| 10,706,160 B1 | 7/2020 | Mohapatra | |
| 10,769,265 B2 | 9/2020 | Daly et al. | |
| 10,771,440 B2* | 9/2020 | Wu | H04L 67/535 |
| 10,834,289 B2 | 11/2020 | Boshoff et al. | |
| 10,853,456 B1* | 12/2020 | Crawforth | H04L 9/14 |
| 10,909,649 B2* | 2/2021 | Yoon | G06T 5/00 |
| 10,949,392 B2 | 3/2021 | Boutnaru | |
| 11,050,591 B2 | 6/2021 | Nikitin | |
| 11,057,192 B2 | 7/2021 | Zheng et al. | |
| 11,200,316 B2 | 12/2021 | Gehtman et al. | |
| 11,295,029 B1* | 4/2022 | Greenblatt | H04N 1/32144 |
| 11,295,300 B2 | 4/2022 | Lieberman et al. | |
| 11,361,075 B1* | 6/2022 | Singh | G06F 21/554 |
| 11,388,310 B2 | 7/2022 | Goncalves et al. | |
| 11,557,227 B2* | 1/2023 | Sanchez | G06N 20/00 |
| 11,681,801 B2* | 6/2023 | Gehtman | G06F 21/568 |
| | | | 726/23 |
| 2003/0026447 A1* | 2/2003 | Fridrich | G06T 1/005 |
| | | | 382/100 |
| 2006/0239502 A1* | 10/2006 | Petrovic | H04N 1/32245 |
| | | | 380/54 |
| 2007/0074026 A1* | 3/2007 | Hicks | G06F 21/564 |
| | | | 713/176 |
| 2010/0191602 A1* | 7/2010 | Mikkelsen | G06Q 40/00 |
| | | | 715/810 |
| 2013/0042294 A1* | 2/2013 | Colvin | G06F 21/6218 |
| | | | 726/1 |
| 2015/0047037 A1* | 2/2015 | Wood | G06F 21/55 |
| | | | 726/23 |
| 2015/0242981 A1* | 8/2015 | Reed | G06T 1/0021 |
| | | | 382/100 |
| 2017/0033837 A1* | 2/2017 | McCormack | G06Q 20/3278 |
| 2017/0126631 A1* | 5/2017 | Vikramaratne | H04L 63/0428 |
| 2017/0169737 A1* | 6/2017 | Probert | G06F 11/3612 |
| 2018/0349400 A1* | 12/2018 | Boutnaru | H04L 63/0428 |
| 2018/0351969 A1* | 12/2018 | MacLeod | H04L 63/0236 |
| 2019/0130117 A1* | 5/2019 | Boutnaru | G06F 21/602 |
| 2020/0226254 A1* | 7/2020 | Gehtman | G06F 21/565 |
| 2020/0226255 A1* | 7/2020 | Gehtman | G06F 21/568 |
| 2021/0006591 A1* | 1/2021 | Akuka | H04L 63/1416 |
| 2021/0042410 A1* | 2/2021 | Gehtman | H03M 7/702 |
| 2021/0192019 A1* | 6/2021 | Lwowski | G06T 1/005 |
| 2022/0164247 A1* | 5/2022 | Mead | G06T 1/0021 |
| 2022/0173899 A1* | 6/2022 | Low | H04L 9/0869 |
| 2023/0231872 A1* | 7/2023 | MacLeod | G06F 21/568 |
| | | | 726/23 |
| 2023/0356539 A1* | 11/2023 | Osborn | G07D 7/00 |
| 2023/0362012 A1* | 11/2023 | Osborn | G09C 5/00 |
| 2023/0362013 A1* | 11/2023 | Osborn | H04L 9/3213 |
| 2024/0104681 A1* | 3/2024 | Kishore | H04N 19/467 |

\* cited by examiner

| Image Fidelity change with increased number of bits being switched |||
|---|---|---|
| Number of bits beginning from least significant bits being switched | Pixel color component binary value | Decimal value |
| 0 | 11111111 | 255 |
| 1 | 11111110 | 254 |
| 2 | 11111100 | 252 |
| 3 | 11111000 | 248 |
| 4 | 11110000 | 240 |
| 5 | 11100000 | 224 |

STEGANOGRAPHIC MODIFICATION DETECTION AND MITIGATION FOR ENHANCED ENTERPRISE SECURITY

BACKGROUND

Aspects of the disclosure relate to modifying images containing steganographic modifications, which may be malicious in nature (e.g., malware, viruses, or other malicious modification) as to mitigate the embedded steganographic modifications.

Users are capable of embedding messages and information in images by embedding steganographic modifications in the images. The modifications may be performed in a way such that the original image is visually similar to the modified image, and thus image fidelity is not greatly impacted. An image contains pixels, each including one or more color components. Each of the one or more color components of the pixel are typically encoded with a byte of information. Users may embed steganographic modifications in an image by changing or modifying (e.g., from one to zero, or zero to one) one or more bits in one or more color components of a number of pixels in an image. Altering the least significant bit of a pixel component may result in the most minimal change to image fidelity (e.g., when compared to the modification of other bits of the pixel component). Enterprises may prefer to maintain image fidelity for consumer clarity and/or user experience. For purposes of enterprise security, it may be important to protect against malicious effects of such steganographic modifications.

SUMMARY

Aspects of the disclosure provide effective, efficient, scalable, and convenient technical solutions for detecting malicious software, and mitigating impacts of malicious software, that may be embedded in a visually ordinary image. In accordance with one or more embodiments of the disclosure, a computing platform comprising at least one processor, a communication interface, and memory storing computer-readable instructions may receive a first image embedded with steganographic modifications that include malicious software. The computing platform may generate a copy of the first image. The computing platform may generate a safe first image by changing or modifying one or more bits beginning from a least significant bit of at least one pixel of the copied image. The computing platform may route the safe first image to a user device. The computing platform may route the first image to an isolation zone and automatically cause, at the isolation zone system, execution of the first image. Based on results of the execution of the steganographic modification of the first image in the isolation zone system, the computing platform may perform one or more security actions. The computing platform may also route the safe first image to a user.

In one or more examples, the computing platform may flag an outside source of the first image as a malicious entity. In one or more examples, a malicious entity may have directed the computing platform to receive the first image embedded with steganographic modifications. In one or more examples, a malicious user may have accessed an image the computing platform stored and modified the image stored by the computing platform with steganography.

In one or more instances, the steganographic modifications to the image may include modifications to one or more color components of a plurality of pixels of the first image.

The computing platform may change or modify at least one of four bits beginning from a least significant bit of a color component of a plurality of pixels of the first image to mitigate the steganographic modifications embedded in the first image.

In one or more instances, the computing platform may receive a second image, route the second image to an isolation zone system, and automatically cause, by the isolation zone system, execution of the second image. The computing platform may identify that the second image contains a steganographic modification. After identifying a steganographic modification in the second image, the computing platform may generate a safe second image by changing or modifying one or more bits beginning from a least significant bit of at least one color component of a plurality of pixels of the second image, and store the safe second image rather than the second image. The computing platform may send the safe second image to a user in response to a request to view the second image by the user.

In one or more instances, the computing platform may receive a third image, and compare the third image to images in an image storage module and assign visual comparison scores to the images in the image storage module. A higher visual comparison score may indicate a higher similarity between the images. The computing platform may store a safe third image from image storage module with the highest visual comparison score rather than the third image to mitigate any steganographic modifications embedded in the third image.

These features, along with many others, are discussed in greater detail below.

BRIEF DESCRIPTION OF THE DRAWINGS

The present disclosure is illustrated by way of example and not limited in the accompanying figures in which reference numerals indicate similar elements and in which.

DETAILED DESCRIPTION

Figure 1A:
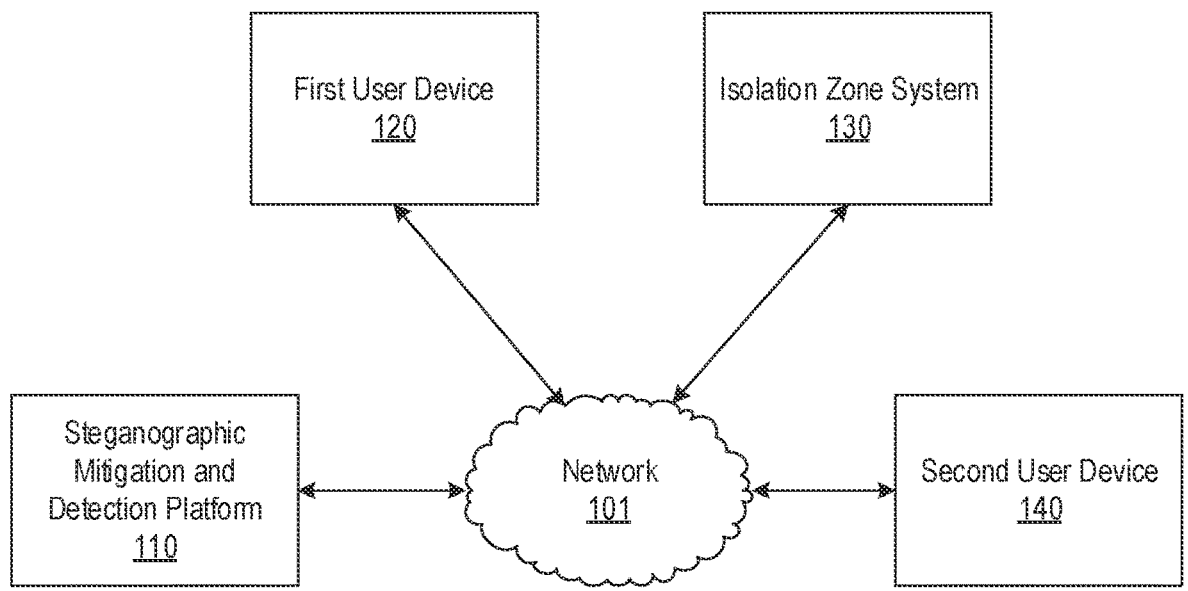
FIGS. 1A-1B depict an illustrative computing environment for mitigating and detecting steganographic modifications embedded in an image in accordance with one or more example embodiments.

In the following description of various illustrative embodiments, reference is made to the accompanying drawings, which form a part hereof, and in which is shown, by way of illustration, various embodiments in which aspects of the disclosure may be practiced. In some instances, other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

As a brief introduction to the concepts described further herein, one or more aspects of the disclosure describe a system for detecting and mitigating (e.g., rendering ineffective) steganographic modifications embedded in an image. Receiving malicious code continues to be a concern for enterprises. Malicious code can be embedded in a stock image, a logo, an innocuous image in an email, or the like. Manipulating the lowest order bits (or least significant bits) of an image may be the best way to embed malicious code because it may be least likely to be detected.

Accordingly, one or more systems and methods described provide technical solutions to address one or more of these technical deficiencies. The aspects described herein implement techniques to detect and/or mitigate steganographic modifications (if present) embedded in an image in a resource-efficient manner.

More specifically, the system may mitigate steganographic modifications embedded in an image by changing or modifying one or more bits of one or more color components of a plurality of pixels of the image beginning from the least significant bit. In other instances, the system may replace images with images that may be free of steganographic modifications if a minimum visual comparison score is met or exceeded. Additionally or alternatively, the system may execute, test, and/or otherwise analyze the image (e.g., to identify any potential steganographic modifications) in an isolation zone system.

The term "image fidelity" may be referred to throughout the specification. As described herein, image fidelity may refer to how closely an image matches a second image, where the second image was generated by changing or modifying one or more bits of one or more color components of a plurality of pixels of the image.

The term "embed with steganographic modification(s)" may also be referred to throughout the specification. As described herein, embedding an image with one or more steganographic modifications may refer to replacing an image with another image that contains a steganographic modification (concealed message or data) while maintaining visual similarity between the modified and original images or to alter an image stored by a server by encoding steganographic modifications.

The term "execute" may also be referred to throughout the specification. As described herein, executing an image may refer to a device receiving or otherwise accessing the image and running all associated information that may be embedded in the image. In some instances, the device may create a bitmap object and retrieve pixel data for the image. The device may extract one or more bits from one or more pixels of the image. In some instances, the device may load the image file and execute code that is embedded in the image file. Additionally or alternatively, the image may be associated with one or more executable files that the device may automatically run when the device accesses the image. In these instances, the executable files may direct the device to decode the image, extracting the software embedded by steganographic modifications.

The term "steganography" may also be referred to throughout the specification. As described herein, steganography refers to the practice of concealing secret messages, information, data, or code (e.g., malicious software such as malware, viruses, adware, ransomware, etc.) in another innocuous file. An image that is embedded with steganographic modifications may have been altered to contain secret messages or software that are undetectable by a user. In some instances, embedding modifications by changing or switching the least significant bit may result in a visually indiscernible visual change to the image.

Figure 1B:
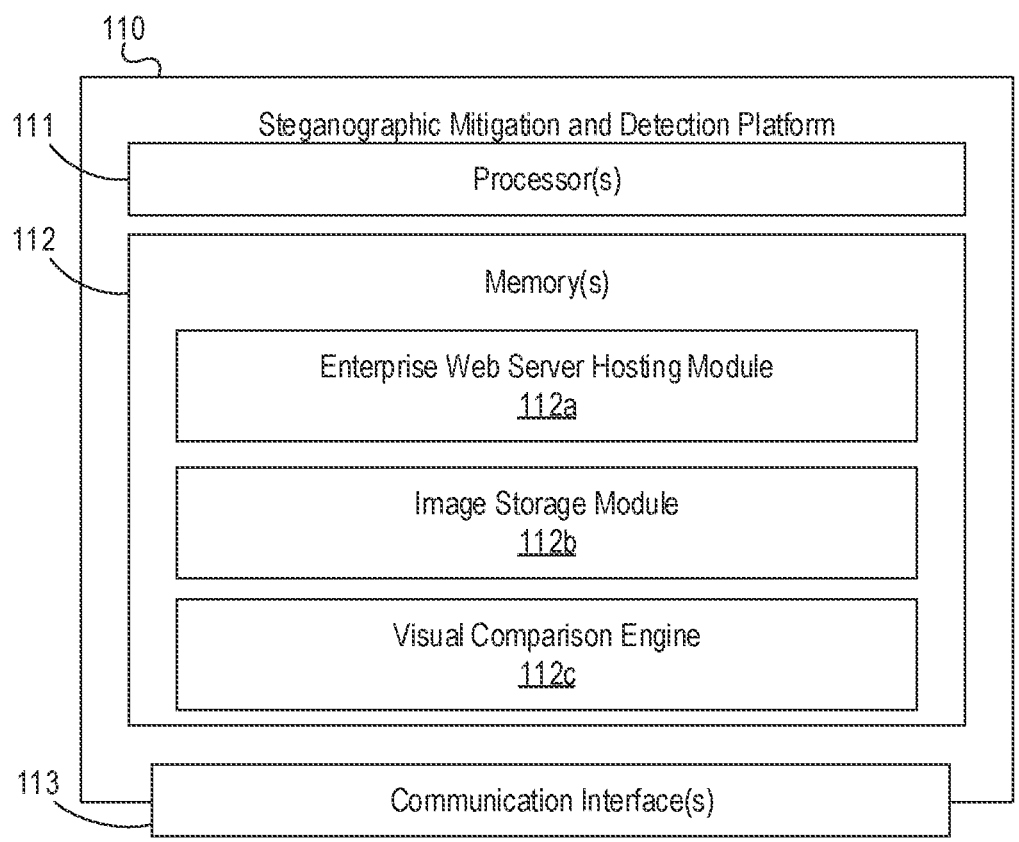

FIGS. 1A-1B depict an illustrative computing environment that implements advanced techniques for mitigation and detection of steganographic modifications embedded in images in accordance with one or more example embodiments. Referring to FIG. 1A, computing environment 100 may include one or more computer systems. For example, computing environment 100 may include a steganographic mitigation and detection platform 110, first user device 120, an isolation zone system 130, and second user device 140.

As described further below, steganographic mitigation and detection platform 110 may be a computer system that includes one or more computing devices (e.g., servers, server blades, or the like) and/or other computer components (e.g., processors, memories, communication interfaces) that may be used to host enterprise website images, associated data such as media (e.g., images, videos, audio), and/or other information. In some instances, the steganographic mitigation and detection platform 110 may be configured to perform mitigation and detection of images embedded with steganographic modifications. In some instances, the steganographic mitigation and detection platform 110 may operate on behalf of or by an enterprise such as a financial institution. In some instances, a party other than the enterprise may operate the steganographic mitigation and detection platform 110. In some instances, the steganographic mitigation and detection platform 110 may host websites, associated website data, and/or other information.

First user device 120 may include one or more computing devices and/or other computer components (e.g., processors, memories, communication interfaces), and may be configured to perform one or more functions related to steganographic images (e.g., interacting with a website, downloading an image from steganographic mitigation and detection platform 110, interacting with an image, executing steganographic modifications embedded in an image, accessing electronic messages including images, or the like). In some instances, first user device 120 may be a laptop computer, desktop computer, mobile device, tablet, smartphone, or the like that may be used by an individual such as a client of an enterprise organization (e.g., a financial institution or the like). In some instances, first user device 120 may be interacting with one or more servers or websites that may contain media, which may, e.g., be uploaded to the servers or websites, and which may, in some instances, be manipulated by a third party (e.g., who may be operating or otherwise associated with the second user device 140). In some instances, the first user device 120 may be configured to display one or more graphical user interfaces (e.g., which may, in some instances, include logos, images, videos, and/or other content).

Isolation zone system 130 may include one or more computing devices and/or other computer components (e.g., processors, memories, communication interfaces), and may be configured to perform one or more functions related to steganographic images (e.g., interacting with a website, downloading an image from steganographic mitigation and detection platform 110, interacting with an image, executing steganographic modifications embedded in an image, or the like). Isolation zone system 130 may execute malicious software embedded in an image. In some instances, isolation zone system 130 may execute, test, and/or otherwise analyze images (e.g., to identify any potential steganographic modifications), while isolating effects of malicious software embedded in images (if any) from steganographic mitigation and detection platform 110, first user device 120, second user device 140, and/or other devices. In some instances, isolation zone system 130 may identify steganographic modifications in an image after executing the image. In some instances, isolation zone system 130 may analyze behavior of malicious software (if any) associated with an image after and/or during execution of the image. For instance, malware such as keylogging software, viruses, or ransomware may be installed after an image is executed. Additionally or alternatively, isolation zone system 130 may execute an image and run the executed image for a duration of time to identify latent malicious software (e.g., malicious software that may not be immediately identifiable upon execution of the image). In some instances, isolation zone system 130 may be a distinct system, separate from steganographic mitigation and detection platform 110, first user device 120, and second user device 140. In other instances, isolation zone system 130 may be a virtual machine integrated into or otherwise associated with steganographic mitigation and detection platform 110, first user device 120, or second user device 140.

Second user device 140 may be a laptop computer, desktop computer, mobile device, tablet, smartphone, or the like that is capable of embedding an image on a web server (such as steganographic mitigation and detection platform 110) with steganographic modifications. In some instances, the second user device 140 may include one or more computing devices and/or other computer components (e.g., processors, memories, communication interfaces), and may be configured to perform one or more functions related to steganographic images (e.g., interacting with a website, downloading an image from steganographic mitigation and detection platform 110, interacting with an image, embedding steganographic modifications in an image, directing a third party device to store an image with steganographic modifications rather than an original image, or the like).

Computing environment 100 also may include one or more networks, which may interconnect steganographic mitigation and detection platform 110, first user device 120, isolation zone system 130, and second user device 140. For example, computing environment 100 may include a network 101 (which may interconnect, e.g., steganographic mitigation and detection platform 110, first user device 120, isolation zone system 130, and/or second user device 140).

In one or more arrangements, steganographic mitigation and detection platform 110, first user device 120, isolation zone system 130, and/or second user device 140 may be any type of computing device capable of sending and/or receiving requests and processing the requests accordingly. For example, steganographic mitigation and detection platform 110, first user device 120, isolation zone system 130, and second user device 140, and/or the other systems included in computing environment 100 may, in some instances, be and/or include server computers, desktop computers, laptop computers, tablet computers, smart phones, or the like that may include one or more processors, memories, communication interfaces, storage devices, and/or other components. As noted above, and as illustrated in greater detail below, any and/or all of steganographic mitigation and detection platform 110, first user device 120, isolation zone system 130, and/or second user device 140, may, in some instances, be special-purpose computing devices configured to perform specific functions.

Referring to FIG. 1B, steganographic mitigation and detection platform 110 may include one or more processors 111, memory 112, and communication interface 113. Communication interface 113 may be a network interface configured to support communication between steganographic mitigation and detection platform 110 and one or more networks (e.g., network 101, or the like). Memory 112 can include one or more program modules having instructions that when executed by processor 111 cause steganographic mitigation and detection platform 110 to perform one or more functions described herein and/or one or more databases that may store and/or otherwise maintain information which may be used by such program modules and/or processor 111. In some instances, the one or more program modules and/or databases may be stored by and/or maintained in different memory units of steganographic mitigation and detection platform 110 and/or by different computing devices that may form and/or otherwise make up steganographic mitigation and detection platform 110. For example, memory 112 may have, host, store, and/or include enterprise web server hosting module 112a, image storage module 112b, and a visual comparison engine 112c.

Enterprise web server hosting module 112a may be configured to host websites or act as an application server. For instance, enterprise web server hosting module 112a may have instructions that direct and/or cause steganographic mitigation and detection platform 110 to execute advanced techniques to provide one or more enterprise web server hosting functions, such as web hosting, interacting with third party devices, receiving and sending media files, and generating safe images by changing or modifying one or more bits of images. Image storage module 112b may store images that are free of malicious software. For instance, image storage module 112b may have instructions that direct and/or cause enterprise web server hosting module 112a to store images and/or generate safe images. Visual comparison engine 112c may have instructions that direct and/or cause enterprise web server hosting module 112a to compare visual similarities of one or more images received by steganographic mitigation and detection platform 110 and safe images stored by image storage module 112b, cloud storage, and/or otherwise stored.

Figure 2A:
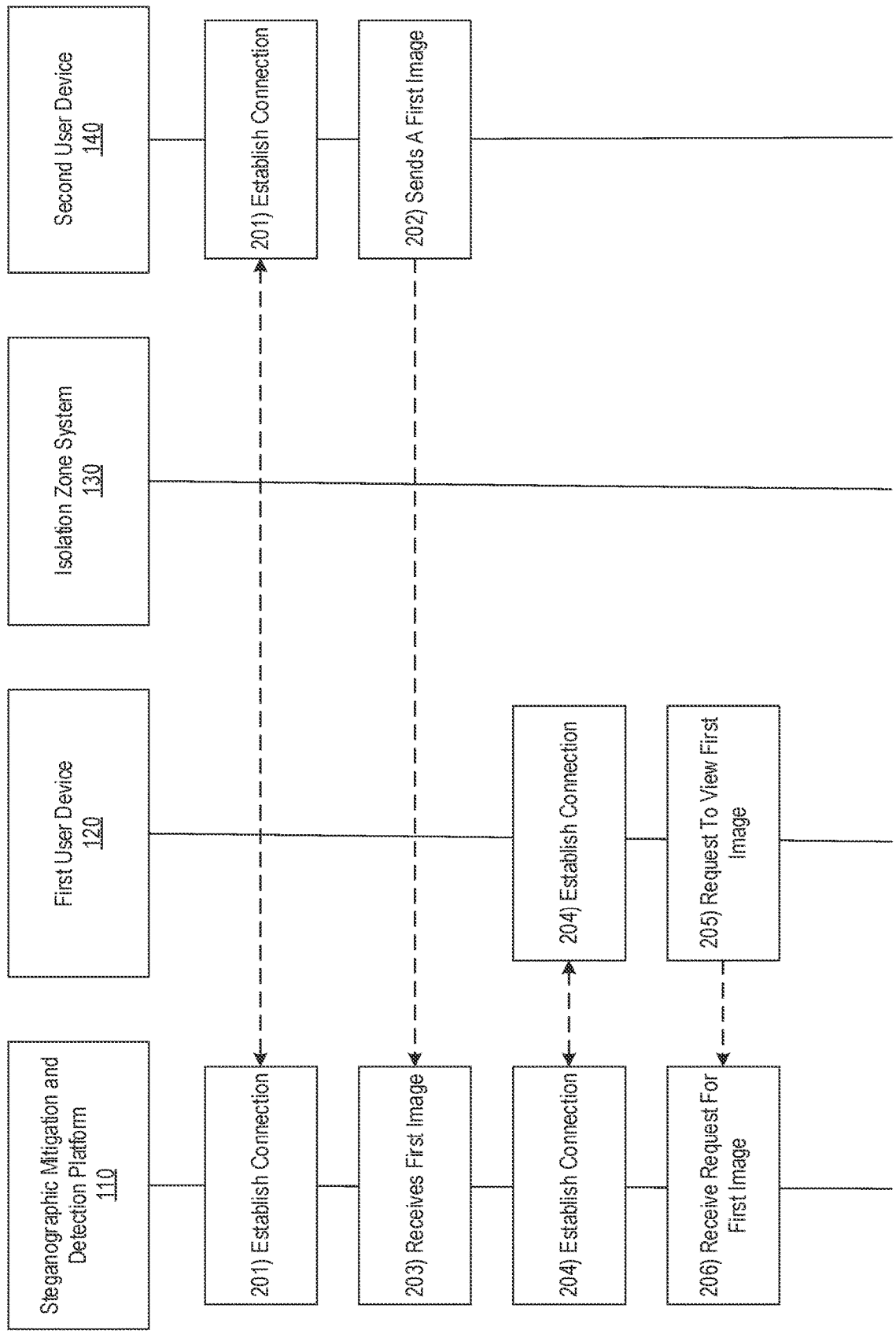
FIGS. 2A-2E depict an illustrative event sequence for mitigating and detecting steganographic modifications embedded in an image in accordance with one or more example embodiments.

FIGS. 2A-2E depict an illustrative event sequence for implementing advanced techniques for mitigation and detection of steganographic modifications embedded in images in accordance with one or more example embodiments. Referring to FIG. 2A, at step 201, the second user device 140 may establish a first connection with the steganographic mitigation and detection platform 110. For example, the second user device 140 may establish a first wireless data connection with the steganographic mitigation and detection platform 110 to link the second user device 140 with the steganographic mitigation and detection platform 110 (e.g., in preparation for sending an image including a steganographic modification or to embed a steganographic modification in an image stored by steganographic mitigation and detection platform 110). In some instances, the second user device 140 may identify whether or not a connection is already established with the steganographic mitigation and detection platform 110. If a connection is already established with the steganographic mitigation and detection platform 110, the second user device 140 might not re-establish the connection. If a connection is not yet established with the steganographic mitigation and detection platform 110, the second user device 140 may establish the first wireless data connection as described herein.

At step 202, the second user device 140 may send a first image to steganographic mitigation and detection platform 110. For example, the second user device 140 may inject malicious code into an image through cross-site scripting, cross-site request forgery, and/or other techniques. In some instances, the second user device 140 may embed an image with steganographic modifications and direct the image steganographic mitigation and detection platform 110 to receive or store the image, causing the steganographic mitigation and detection platform to additionally receive the malicious code. In some instances, this image may be visually similar to an image stored by the steganographic mitigation and detection platform 110. In some instances, the second user device 140 may send the first image to the steganographic mitigation and detection platform 110 while the first wireless data connection is established. In some instances, the first image may be embedded with steganographic modifications containing malicious software. In other instances, the first image might not be embedded with malicious software through steganographic modifications.

At step 203, the steganographic mitigation and detection platform 110 may receive the first image. For example, the steganographic mitigation and detection platform 110 may receive the first image via the communication interface 113 and while the first wireless data connection is established.

At step 204, first user device 120 may establish a second connection with steganographic mitigation and detection platform 110. For example, the first user device 120 may establish a second wireless data connection with the steganographic mitigation and detection platform 110 so that the first user device 120 may access the enterprise server website, images and associated information and media (e.g., the first user device 120 may access a financial institution's website that contains images). In some instances, the first user device 120 may identify whether or not a connection is already established with the steganographic mitigation and detection platform 110. If a connection is already established with the steganographic mitigation and detection platform 110, the first user device 120 might not re-establish the connection. If a connection is not yet established with the steganographic mitigation and detection platform 110, the first user device 120 may establish the first wireless data connection as described herein.

At step 205, first user device 120 may send a request to view the first image to the steganographic mitigation and detection platform 110. For example, the first user device 120 may attempt to access the steganographic mitigation and detection platform 110 (through an internet browser, mobile application, personal computer (PC) application, or the like). In some instances, the first user device 120 may send the request to view the first image to the steganographic mitigation and detection platform 110 while the second wireless data connection is established.

At step 206, the steganographic mitigation and detection platform 110 may receive the request to view the first image sent at step 205. For example, the steganographic mitigation and detection platform 110 may receive the request to view the first image via the communication interface 113 and while the second wireless data connection is established. The steganographic mitigation and detection platform 110 may make information, including images, accessible to the first user based on the request to view the first image from the first user device 120.

Figure 2B:
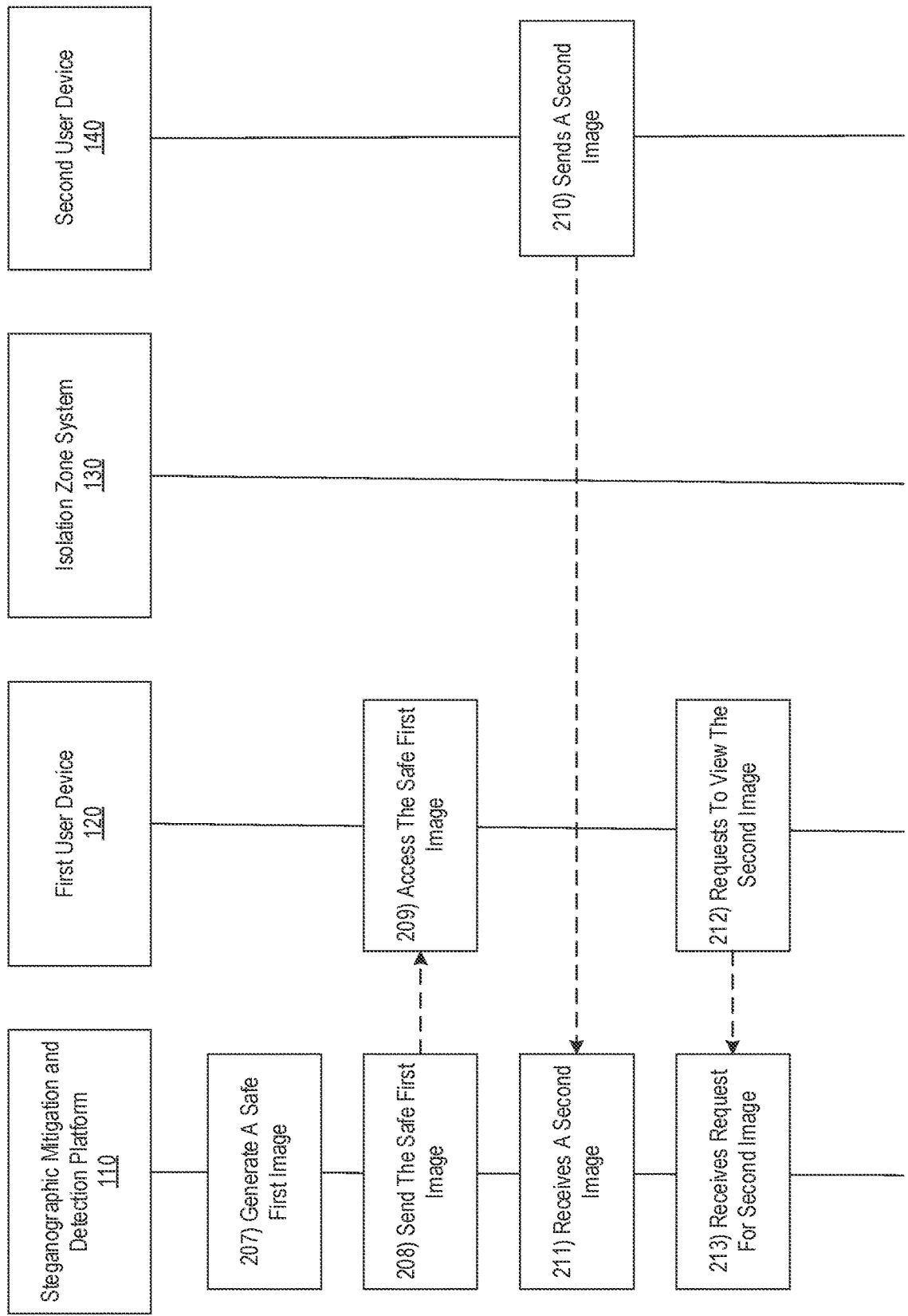

Referring to FIG. 2B, at step 207, the steganographic mitigation and detection platform 110 may generate a safe first image corresponding to the first image. For example, the steganographic mitigation and detection platform 110 may generate the safe first image by changing or modifying one or more bits, beginning from a least significant bit of one or more color components of one or more pixels of the first image. In some instances, the steganographic mitigation and detection platform 110 may be configured to change or modify between one to four bits beginning from the least significant bit of the one or more color components of the one or more pixels of the first image. In some instances, the steganographic mitigation and detection platform 110 may change or modify the bits by changing or modifying or directing another system to change or modify bits with a "0" value to a "1" value and changing or modifying bits with a "1" value to a "0" value.

Figures 3A, 3B:
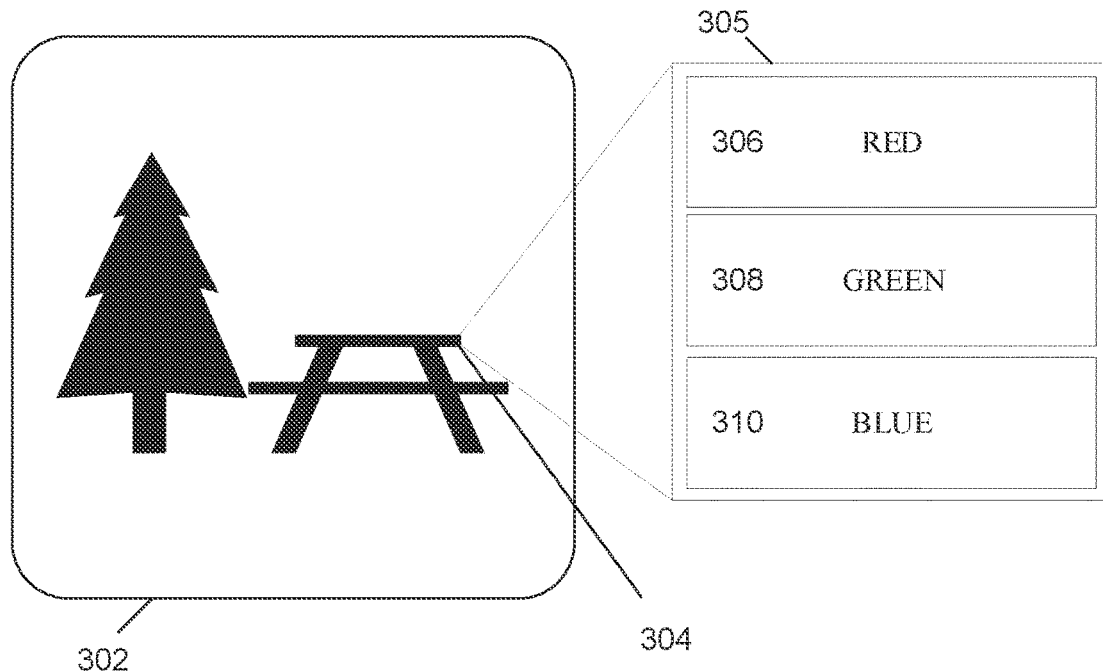
FIG. 3A depicts an illustrative image containing a plurality of pixels and color components of a pixel in accordance with one or more example embodiments.
FIG. 3B depicts illustrative byte data of a color component of a pixel corresponding to decimal numbers in accordance with one or more example embodiments.

For example, FIG. 3A depicts an image 302 and a pixel of the image 305 with corresponding color components RED 306, GREEN 308, and BLUE 310 (other pixel topographies may exist and the same principles discussed may apply). In FIG. 3B, example binary table 312 depicts magnitude change of a binary value as different numbers of bits, beginning from the least significant bit, are switched. The value of "11111111" yields a decimal value of 255. As the number of bits that are switched increases, the difference the decimal value changes may grow exponentially. Because steganographic modifications are typically embedded in one or more least significant bits of the image, changing or modifying one or bits beginning from the least significant of one or more pixels may render steganographic modifications, which would otherwise execute on first user device 120, ineffective. The steganographic mitigation and detection platform 110 may also generate a copy of and store the first image for analyzing purposes. In these instances, the steganographic mitigation and detection platform 110 may alternatively generate the safe first image from the copy of the image embedded with steganographic modifications.

With further reference to FIG. 2B, at step 208, the steganographic mitigation and detection platform 110 may send the safe first image to the first user device 120 based on the request to view the first image. In addition or as an alternative to sending the safe first image to the first user device 120, the steganographic mitigation and detection platform 110 may send (e.g., at substantially the same time or otherwise) the first image (e.g., the image containing potentially malicious software) to isolation zone system 130 for execution, testing, and/or other analysis (e.g., to identify any potential steganographic modifications).

At step 209, the first user device 120 may access the safe first image. In some instances, first user device 120 may access the safe first image by receiving the safe first image from the steganographic mitigation and detection platform 110, viewing the safe first image stored by steganographic mitigation and detection platform 110, and/or otherwise.

At step 210, the second user device 140 may send a second image to steganographic mitigation and detection platform 110. The second image may be embedded with steganographic modifications. In some instances, the second user device 140 may send the second image to the steganographic mitigation and detection platform 110 while the first wireless data connection is established. In some instances, actions performed at step 210 may be similar to those described above at step 202.

At step 211, the steganographic mitigation and detection platform 110 may receive the second image. The steganographic mitigation and detection platform 110 may also generate a copy of and store the second image for analyzing purposes. For example, the steganographic mitigation and detection platform 110 may receive the second image via the communication interface 113 and while the first wireless data connection is established.

At step 212, first user device 120 may send a request to view the second image to the steganographic mitigation and detection platform 110. For example, the first user device 120 may attempt to access the steganographic mitigation and detection platform 110 (through an internet browser, mobile application, PC application, or the like). In some instances, the first user device 120 may send the request to view the second image to the steganographic mitigation and detection platform 110 while the second wireless data connection is established.

At step 213, steganographic mitigation and detection platform 110 may receive the request to view the second image sent at step 212. For example, the steganographic mitigation and detection platform 110 may receive the request to view the second image via the communication interface 113 and while the second wireless data connection is established. The steganographic mitigation and detection platform 110 may make information, including images, accessible to the first user based on the request to view the second image from the first user device 120.

Figure 2C:
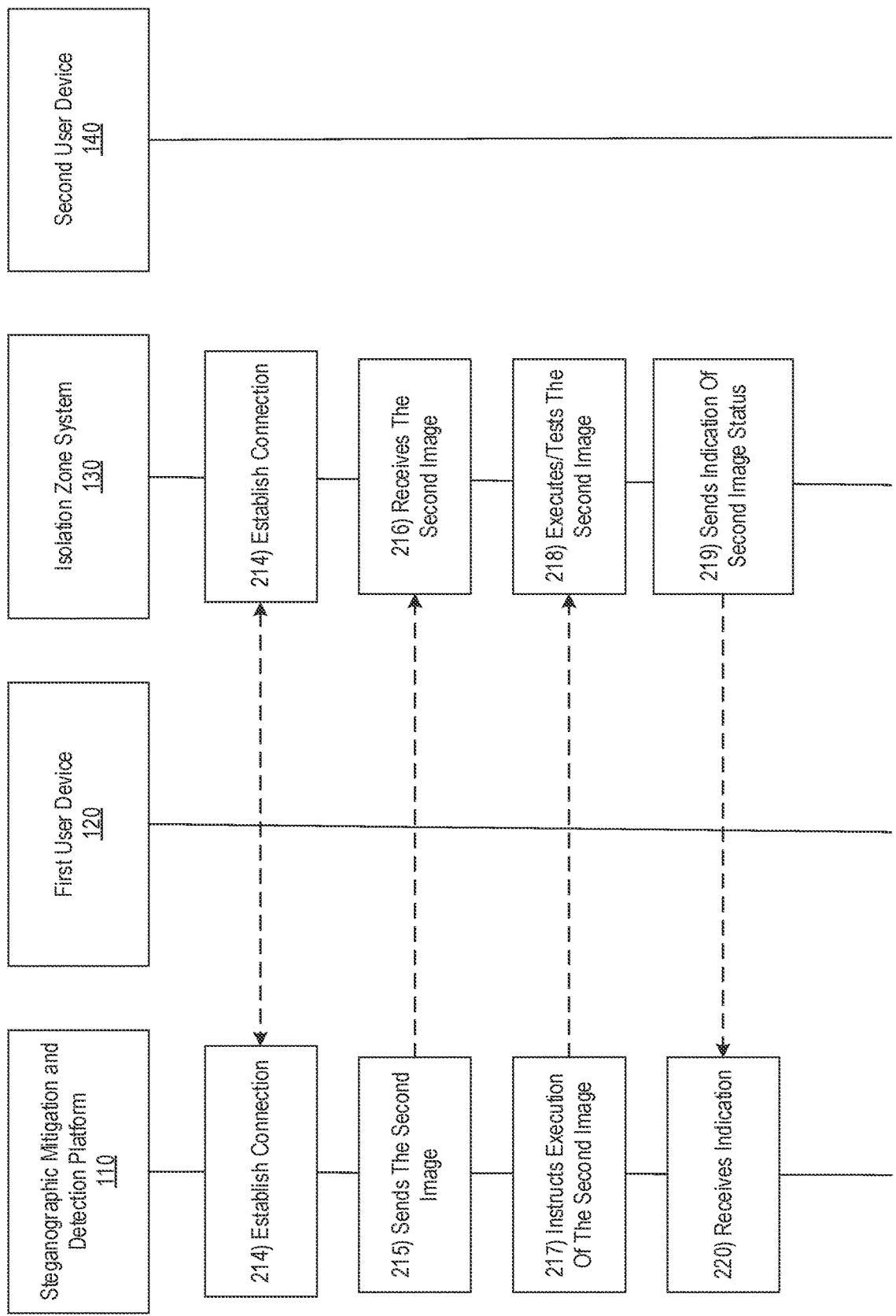

Referring to FIG. 2C, at step 214, isolation zone system 130 may establish a third connection with steganographic mitigation and detection platform 110 (e.g., to link the isolation zone system 130 to the steganographic mitigation and detection platform 110). In some instances, isolation zone system 130 may identify whether or not a connection is already established with the steganographic mitigation and detection platform 110. If a connection is already established with the steganographic mitigation and detection platform 110, isolation zone system 130 might not re-establish the connection. If a connection is not yet established with the steganographic mitigation and detection platform 110, isolation zone system 130 may establish the first wireless data connection as described herein.

At step 215, steganographic mitigation and detection platform 110 may send the second image to isolation zone system 130. In some instances, isolation zone system 130 may be a virtual environment in steganographic mitigation and detection platform 110. In other instances, isolation zone system 130 may be a virtual environment in first user device 120 or second user device 140. In other instances, isolation zone system 130 may be maintained or otherwise hosted by a third party server.

At step 216, isolation zone system 130 may receive the second image. For example, isolation zone system 130 may receive the second image while the third wireless data connection is established.

At step 217, steganographic mitigation and detection platform 110 may automatically cause or direct (e.g., by sending one or more commands) isolation zone system 130 to execute, test, and/or otherwise analyze the second image. In some instances, steganographic mitigation and detection platform 110 may instruct isolation zone system 130 to execute, test, and/or otherwise analyze the second image in response to first user device 120 requesting to view the second image. In other instances, steganographic mitigation and detection platform 110 may automatically direct isolation zone system 130 to execute, test, and/or otherwise analyze the second image upon receiving, locating, or tagging the second image stored by steganographic mitigation and detection platform 110.

At step 218, based on or in response to the commands and/or other directions of the steganographic mitigation and detection platform 110, the isolation zone system 130 may execute, test, and/or otherwise analyze the second image. In some instances, isolation zone system 130 may indicate the presence of an unsafe modification to the second image. In some instances, isolation zone system 130 may identify that the second image is embedded with harmful steganographic modifications (e.g., keylogging software intended to compromise first user device 120, ransomware intended to comprise the enterprise that steganographic mitigation and identification platform may operate on behalf of, or the like). In other instances, isolation zone system 130 may identify that the second image is not embedded with steganographic modifications.

At step 219, isolation zone system 130 may send an indication that the second image is embedded with at least one steganographic modification to steganographic mitigation and detection platform 110. In some instances, isolation zone system 130 may send an indication that second image is not embedded with steganographic modifications to steganographic mitigation and detection platform 110 (e.g., that the second image is safe or otherwise has not been corrupted).

At step 220, steganographic mitigation and detection platform 110 may receive the indication that the second image is embedded with steganographic modifications, making the second image unsafe for first user device 120 to run or execute (e.g., as sent at step 219 above). In some instances, steganographic mitigation and detection platform 110 may receive an indication that the second image is safe for first user device 120 to run or execute. In some instances, steganographic mitigation and detection platform 110 may perform one or more security actions in response to isolation zone system 130 indicating that one or more images contain a steganographic modification. In some instances, the one or more security actions may include flagging a source of the second image as a second user device 140 (a malicious entity). In other instances, the one or more security actions may include automatically alerting authorities of the flagged source. In other instances, the one or more security actions may include revoking enterprise privacy and/or security authorizations associated with the second user device 140.

Figure 2D:
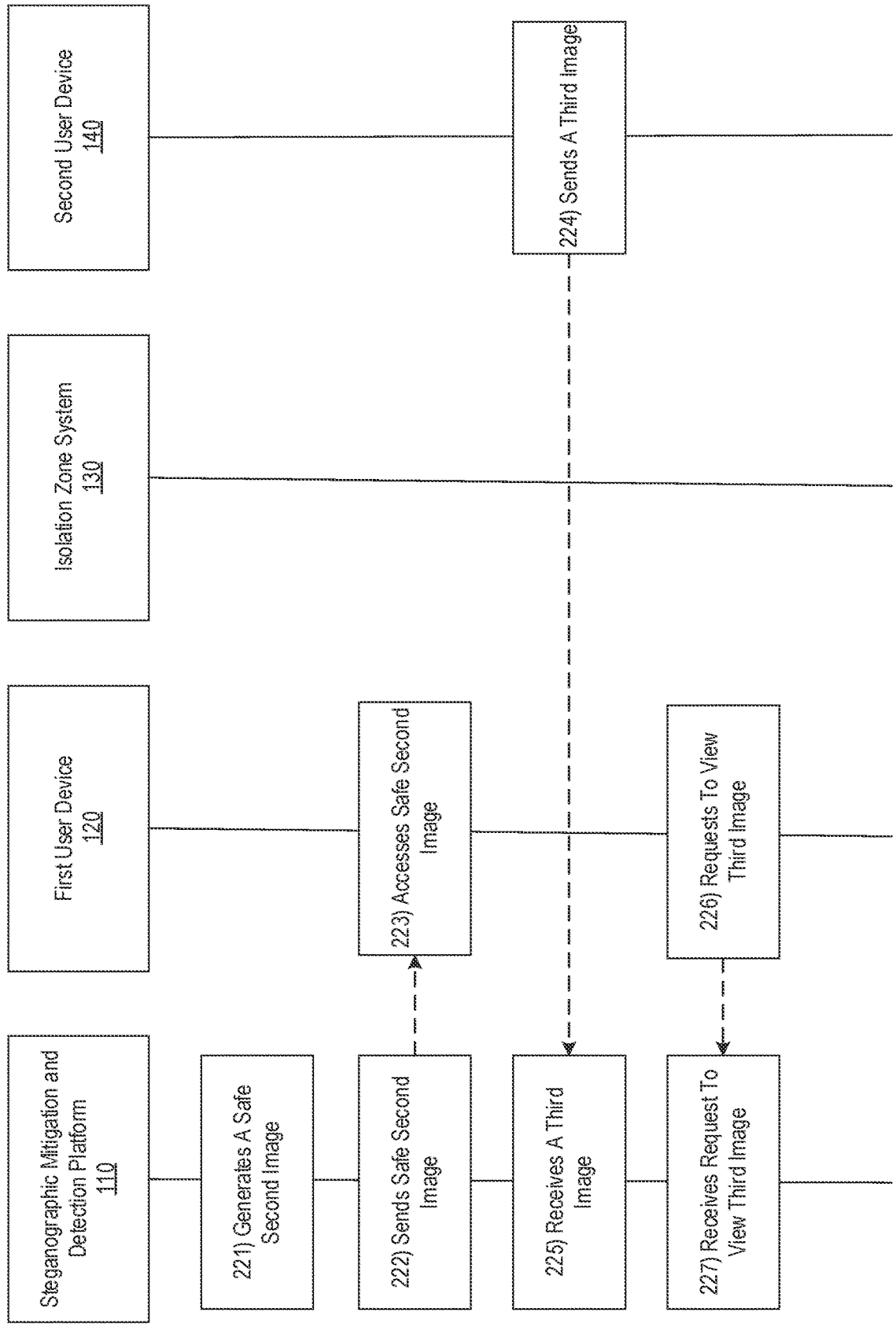

Referring to FIG. 2D, at step 221, based on or responsive to the indication from isolation zone system 130 that the second image contains steganographic modifications, the steganographic mitigation and detection platform 110 may automatically generate a safe second image from the second image. In some instances, steganographic mitigation and detection platform 110 may copy the second image and generate a safe second image by changing or modifying one or more bits of one or more color components of one or more pixels of the copy of the second image. In some instances, steganographic mitigation and detection platform 110, based on or responsive to the indication from isolation zone system 130 that the second image contains steganographic modifications, may direct or cause first user device 120 to generate a safe second image from the second image before executing. In other instances, steganographic mitigation and detection platform, based on or responsive to the indication from isolation zone system 130 that the second image contains steganographic modifications, may direct or cause isolation zone system 130 to generate a safe second image from the second image.

In some instances, steganographic mitigation and detection platform 110 may send the safe second image to isolation zone system 130 in a reiterative process. In these instances, isolation zone system 130 may execute, test, and/or otherwise analyze the safe second image and send an indication of the second image being safe or unsafe. If the generated safe second image remains unsafe (e.g., not all steganographic modifications were addressed in generation of the safe second image), steganographic mitigation and detection platform 110 may generate a new safe second image where more bits are switched.

Example table 312 of FIG. 3B depicts magnitude change of a binary value as different numbers of bits, beginning from the least significant bit, are switched. The value of "11111111" yields a decimal value of 255. As the number of bits beginning form the least significant bit that are switched increases, the decimal value change grows exponentially. Changing or modifying the least significant bit changes the decimal value by one, while changing 4 bits beginning from the least significant bit yields a difference of 25. Changing or modifying more bits of a pixel's color component may lead to a safer image (the likelihood of mitigating steganographic modifications embedded in the image are higher because third parties are limited to how high numbered a bit they may change or modify when embedding their modifications in an image while maintaining image fidelity). To that same effect, changing or modifying more bits of a pixel's color component may cause a generated safe second image to have reduced image fidelity to the degree where it might no longer be usable. Increased safety may lead to lower image fidelity. An enterprise or controller may determine how many bits beginning from the least significant bit to change or modify depending on its need for safety and image fidelity. In some instances, this number of bits may be automatically identified by the steganographic mitigation and detection platform 110. In some instances, changing or modifying more than 4 bits beginning from the least significant bit may lead to poor image fidelity.

Steganographic mitigation and detection platform 110 may direct isolation zone system 130 to execute, test, and/or otherwise analyze the safe second image, and isolation zone system 130 may identify that the safe second image is embedded with steganographic modifications. In this instance, steganographic mitigation and detection platform 110 may change or modify two bits beginning from the least significant bit of one or more color components of one or more pixels of the second image in response to the safe second image being embedded with steganographic modifications. Isolation zone system 130 may execute, test, and/or otherwise analyze the safe second image where two bits have been switched rather than one. In some instances, steganographic mitigation and detection platform 110 may repeat this process, increasing the number of bits that are switched until the isolation zone system 130 no longer indicates that the safe second image is embedded with steganographic modifications.

At step 222, steganographic mitigation and detection platform 110 may make the safe second image available to first user device 120. In some instances, steganographic mitigation and detection platform 110 may send the safe second image to first user device 120.

At step 223, first user device 120 may access the safe second image. First user device 120 may access the safe second image by receiving the safe second image from steganographic mitigation and detection platform 110, viewing the safe second image stored by steganographic mitigation and detection platform 110, and/or otherwise.

Although actions performed by the isolation zone system 130 are described with regard to the second image, such actions may be performed and/or combined with any of the techniques described with regard to the first image without departing from the scope of the disclosure.

At step 224, the second user device 140 may send a third image to steganographic mitigation and detection platform 110. For example, the second user device 140 may inject malicious code into an image through cross-site scripting, cross-site request forgery, and/or other techniques. In some instances, the second user device 140 may embed an image with steganographic modifications and direct an image steganographic mitigation and detection platform to receive or store the image, causing the steganographic mitigation and detection platform to additionally receive the malicious code. In some instances, the third image may be visually similar to an image stored by the steganographic mitigation and detection platform 110. In some instances, the second user device 140 may send the third image to the steganographic mitigation and detection platform 110 while the first wireless data connection is established. In some instances, the first image may be embedded with steganographic modifications containing malicious software. In other instances, the third image might not be embedded with malicious software through steganographic modifications.

At step 225, steganographic mitigation and detection platform 110 may receive the third image. The steganographic mitigation and detection platform 110 may also generate a copy of and store the third image for analyzing purposes. For example, the steganographic mitigation and detection platform 110 may receive the third image via the communication interface 113 and while the first wireless data connection is established.

At step 226, first user device 120 may send a request to view the third image to the steganographic mitigation and detection platform 110. For example, the first user device 120 may attempt to access the steganographic mitigation and detection platform 110 (through an internet browser, mobile application, PC application, or the like). In some instances, the first user device 120 may send the request to view the third image to the steganographic mitigation and detection platform 110 while the second wireless data connection is established.

At step 227, steganographic mitigation and detection platform 110 may receive the request to view the third image sent at step 226. For example, the steganographic mitigation and detection platform 110 may receive the request to view the second image via the communication interface 113 while the second wireless data connection is established.

Figure 2E:
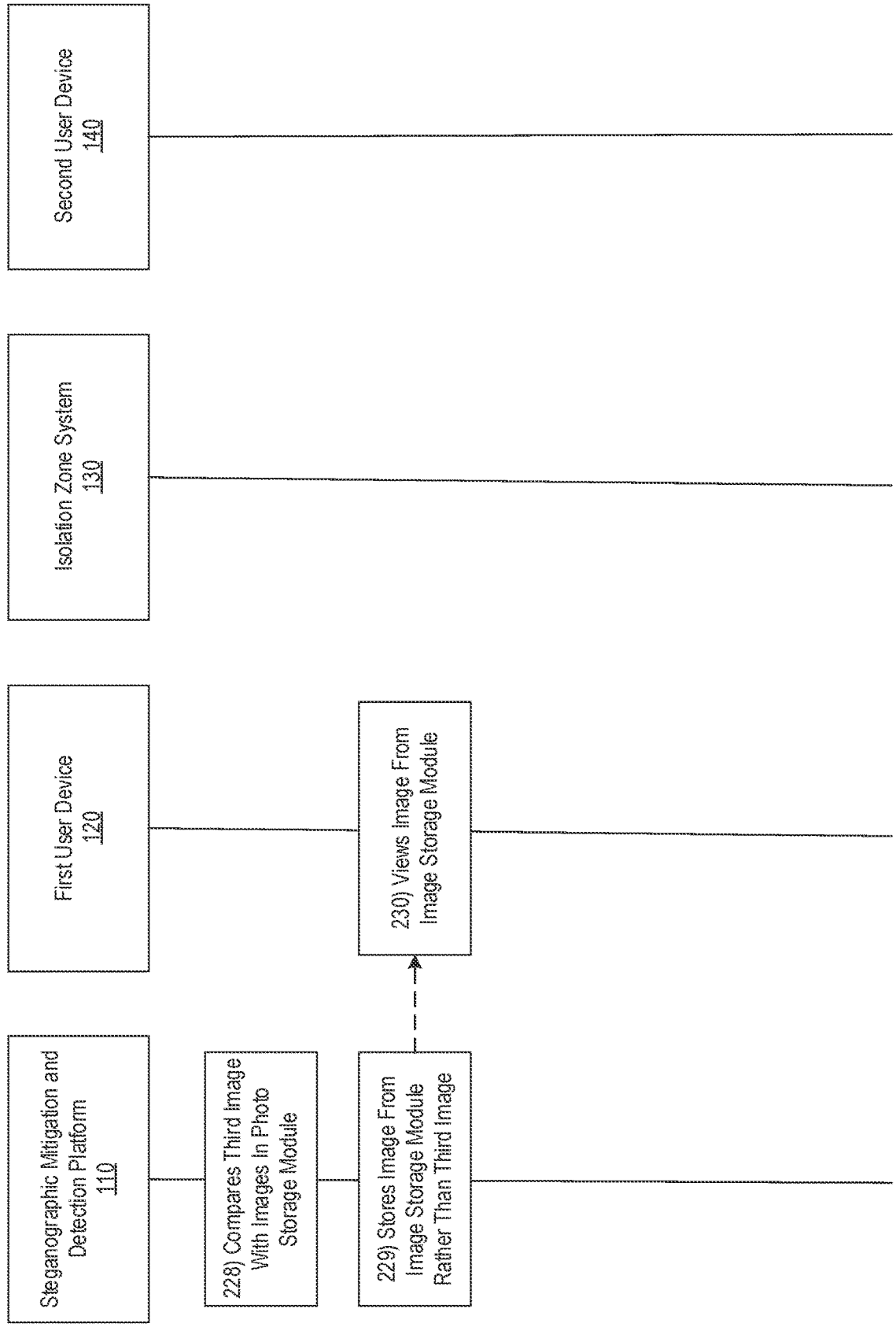

Referring to FIG. 2E, at step 228, steganographic mitigation and detection platform 110 may compare the third image to images stored in image storage module 112b, cloud storage, and/or otherwise stored. For example, the enterprise may store logos, images, and/or other content known to be safe (e.g., not embedded with steganographic modifications). In some instances, steganographic mitigation and detection platform 110, may assign a visual comparison score between the second image and the images stored in image storage module, where a higher score corresponds to a closer visual match. For example, the third image may be an enterprise logo that has been embedded with malware. Visual comparison engine 112c of steganographic mitigation and detection platform 110 may compare the third image (an enterprise logo) against images in image storage module 112b. Visual comparison engine 112c may assign a visual comparison score to one or more images stored in image storage module 112b (e.g., different generations of enterprise logos, letterheads, advertisement themes, etc.). Third image may be an older generation logo, causing visual comparison engine to assign high scores to all stored logo images, but assigning the highest score to the logo of the generation corresponding to the third image.

At step 229, steganographic mitigation and detection platform 110 may store the identified image having the highest visual comparison score rather than the third image. In this instance, steganographic mitigation and detection platform 110 no longer stores the third image. In other instances, steganographic mitigation and detection platform 110 may route the identified image having the highest visual comparison score to first user device 120 rather than the third image and continues to store the third image (e.g., so as to send a known safe image). In some instances, steganographic mitigation and detection platform 110 may have a minimum score qualification for an image in image storage module 112b to qualify for routing to first user device 120. In other instances, steganographic mitigation and detection platform 110 may have a minimum score qualification for an image in image storage module 112b to qualify for storing the image from image storage module 112b rather than the third image.

At step 230 first user device 120 may access the safe third image. First user device 120 may access the safe third image by receiving the safe third image from steganographic mitigation and detection platform 110, viewing the safe third image stored by steganographic mitigation and detection platform 110, or the like). Although the image comparison and/or replacement techniques are described only with regard to the third image, such techniques may be performed and/or combined with any of the above described techniques as applied to the first and/or second image without departing from the scope of the disclosure.

Accordingly, the steps discussed in FIGS. 2A-2E may enhance a computer's ability to mitigate or detect harmful effects of images embedded with steganographic modifications by allowing the computer to perform the mitigation steps quicker and use less processing power before any impact is experienced by a device and/or the enterprise network.

Although a single first user device 120, isolation zone 130, and second user device 140 are described herein, any number of event processing systems may be implemented using one or more of the methods described herein without departing from the scope of the disclosure. Furthermore, although detection and mitigation of steganographic modifications embedded in an image are described with regard to steganographic mitigation and detection platform 110, detection and mitigation of steganographic modifications embedded in an image, in some instances, may be performed by first user device 120 or isolation zone system 130 without departing from the scope of the disclosure.

Figure 4:
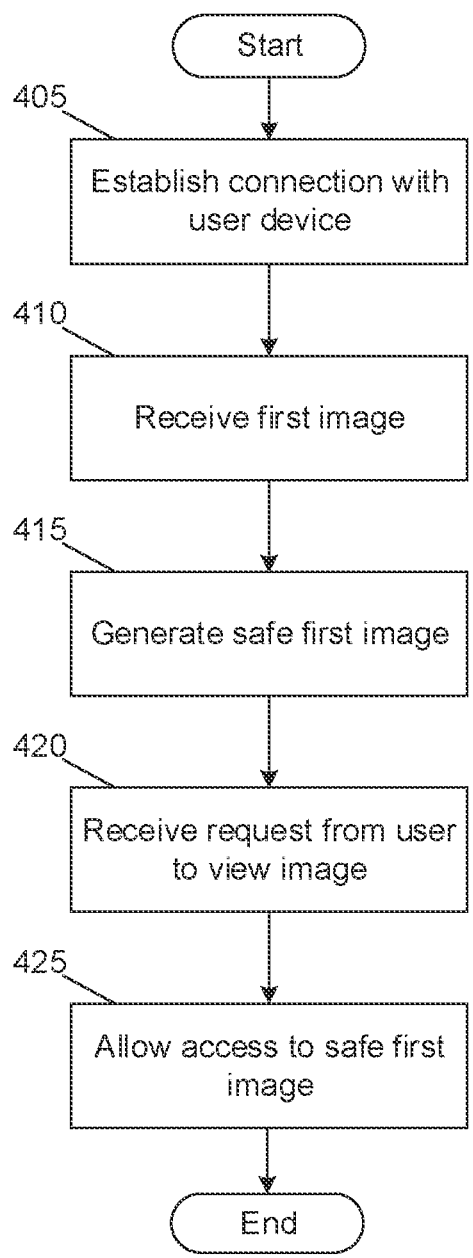
FIGS. 4-6 depict illustrate methods for mitigating and detecting stenographic modifications in accordance with example embodiments in accordance with one or more example embodiments.

FIG. 4 depicts an illustrative method for mitigating steganographic modifications embedded in an image in accordance with one or more example embodiments. Referring to FIG. 4, at step 405, a computing platform having at least one processor, a communication interface, and memory may establish a connection with second user device 140. At step 410, the computing platform may receive a first image from second user device 140. At step 415, computing platform may generate a safe first image. at step 420, computing platform may receive a request from a user to view the first image. at step 425, computing platform may allow access to the safe first image. First user device 120 may access the safe first image by receiving the safe first image from Steganographic mitigation and detection platform 110, viewing the safe first image stored by steganographic mitigation and detection platform 110, or the like).

Figure 5:
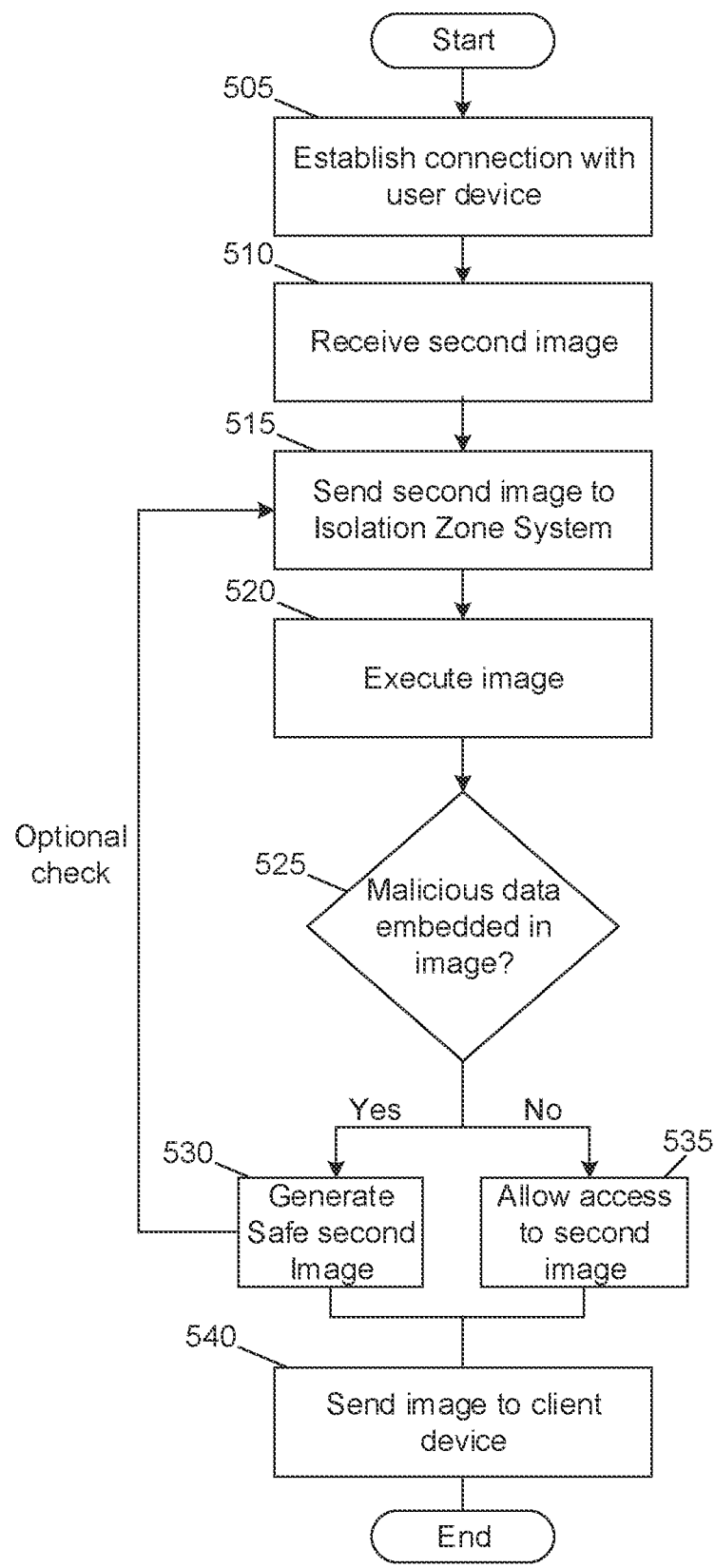

FIG. 5 depicts an illustrative method for detecting steganographic modifications embedded in an image and mitigating the steganographic modifications in accordance with one or more example embodiments. Referring to FIG. 5, at step 505, a computing platform having at least one processor, a communication interface, and memory may establish a connection with second user device 140. At step 510, the computing platform may receive a second image from second user device 140. At step 515, the computing platform may send the second image to isolation zone system 130. At step 520, isolation zone system 130 may execute, test, and/or otherwise analyze the second image. At step 525, the isolation zone system 130 may indicate to computer platform whether the second image is embedded with steganographic modifications. If the second image is embedded with steganographic modifications, the computing platform may proceed to step 530. Otherwise, if the second image is not embedded with steganographic modifications, the computing platform may proceed to step 535. At step 530, the computing platform may generate a safe second image based on the indication from the isolation zone system 130 that the second image is embedded with steganographic modifications. The computing platform may, optionally, reroute the safe second image to isolation zone system 130 to run or execute (e.g., return to step 515). Isolation zone system may repeat steps 515 to 530 based on the indication that the safe second image is embedded with steganographic modifications, the computing platform may generate a new safe second image, where more bits are switched. The computing platform may repeat steps 515 to 530, until an image that is not embedded with steganographic modifications is generated. At step 535, computing platform may allow access to the original image that is not embedded with steganographic modifications. In other instances, computing platform may generate a safe second image even if the second image is free of steganographic modifications. At step 540, first user device 120 may access the safe second image by receiving the safe second image from steganographic mitigation and detection platform 110, viewing the image stored by steganographic mitigation and detection platform 110, and/or otherwise.

Figure 6:
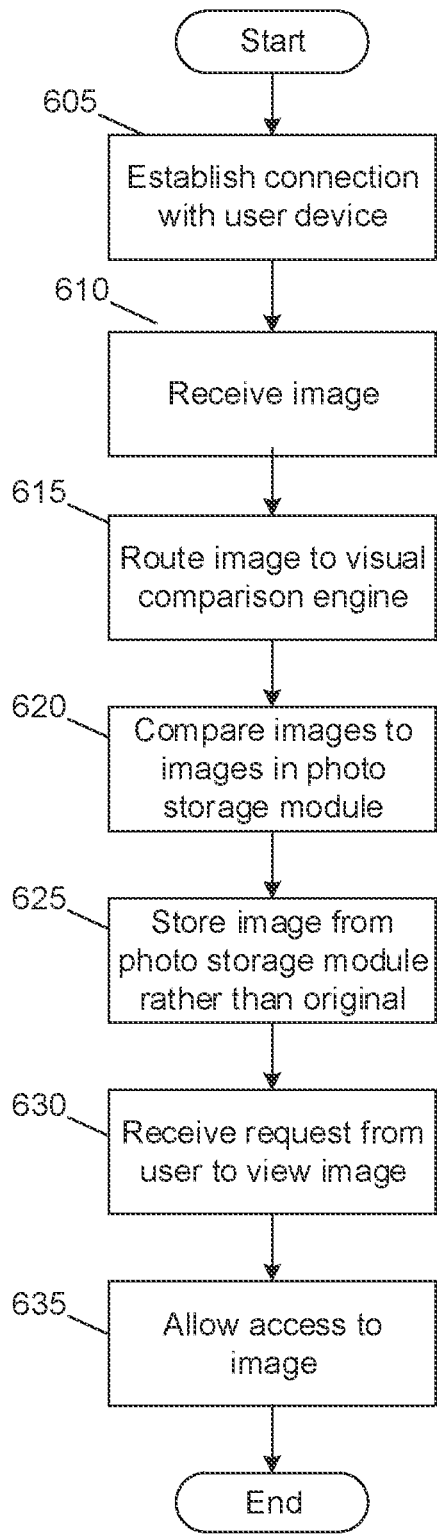

FIG. 6 depicts an illustrative method for mitigating harmful effects of images embedded with steganographic modifications in accordance with one or more example embodiments. At step 605, a computing platform having at least one processor, a communication interface, and memory may establish a connection with second user device 140. At step 610, the computing platform may receive a third image from second user device 140. At step 615, the computing platform may route the third image to a visual comparison engine 112c. At step 620, visual comparison engine 112c may compare the third image to images stored in image storage module 112b. Visual comparison engine 112c may assign a visual comparison score to each of the images stored in image storage module. At step 625, the computing platform may store the image from image storage module 112b with the highest visual comparison score rather than the third image received at step 610. In some instances, the computing platform may have a minimum visual comparison score that an image from image storage module must have to be stored by computing platform rather than the third image from step 610. At step 630, the first user device 120 may request to view the third image. at step 635, the computing platform may allow first user device 120 access to the stored image (the safe third image). The first user device 120 may access the stored image in any practicable manner (receiving the third safe image from steganographic mitigation and detection platform 110, viewing the image stored by steganographic mitigation and detection platform 110, or the like).

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, application-specific integrated circuits (ASICs), field programmable gate arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally, or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, and one or more depicted steps may be optional in accordance with aspects of the disclosure.

What is claimed is:

1. A computing platform, comprising:
   at least one processor;
   a communication interface communicatively coupled to the at least one processor; and
   a memory storing computer-readable instructions that, when executed by the at least one processor, cause the computing platform to:
      receive a first image, embedded with steganographic modifications comprising modifications to one or bits of a plurality of pixels of the first image, wherein the steganographic modifications comprise malicious software;
      generate a copy of the first image;
      generate a safe first image of the copy of the first image by changing or modifying one or more bits beginning from a least significant bit of at least one pixel of the copy of the first image, wherein generating the safe first image of the copy of the first image renders the steganographic modifications ineffective;
      route the safe first image to a first user device;
      route the first image to an isolation zone system;
      automatically cause, at the isolation zone system through one or more commands directing the isolation zone system to execute the steganographic modifications of the first image, execution of the steganographic modifications of the first image; and
      perform, based on results of the execution of the steganographic modifications of the first image in the isolation zone system, one or more security actions.

2. The computing platform of claim 1, wherein the one or more security actions comprise:
   flagging an outside source of the first image as a malicious entity.

3. The computing platform of claim 2, wherein embedding the first image with the steganographic modifications comprises accessing a stored image at the computing platform, and modifying the stored image through steganography.

4. The computing platform of claim 2, wherein embedding the first image with the steganographic modifications comprises directing the computing platform to store an image with steganographic modifications.

5. The computing platform of claim 1, wherein the memory stores additional computer-readable instructions that, when executed by the at least one processor, cause the computing platform to:
   receive a second image;
   route the second image to the isolation zone system;
   automatically cause, at the isolation zone system through one or more commands directing the isolation zone system to execute the second image, execution of the second image;
   identify, based on execution of the second image, whether or not the second image contains a second steganographic modification; and
   based on identifying that the second image contains the second steganographic modification comprises malicious software:
      generate a safe second image by changing or modifying one or more bits beginning from a least significant bit of at least one color component of a plurality of pixels of the second image, wherein generating the safe second image renders the second steganographic modifications of the second image ineffective, and store the safe second image rather than the second image.

6. The computing platform of claim 1, wherein the steganographic modifications embedded in the first image comprise modifications to one or more color components of the plurality of pixels.

7. The computing platform of claim 6, wherein the safe first image is generated by changing or modifying at least one of four bits beginning from a least significant bit of at least one color component of all pixels of the first image.

8. The computing platform of claim 1, wherein the memory stores computer-readable instructions that, when executed by the at least one processor, cause the computing platform to:

store the safe first image rather than the first image.

9. The computing platform of claim 1, wherein routing the safe first image to the first user device is responsive to receiving a request from the first user device to view the first image.

10. The computing platform of claim 1, wherein the memory stores additional computer-readable instructions that, when executed by the at least one processor, cause the computing platform to:

receive a third image;
compare the third image to a plurality of stored verified images;
identify that the third image matches an image from the plurality of stored verified images;
store the identified image rather than the third image, wherein storing the identified image rather than the third image renders any steganographic modifications of the third image ineffective; and
route the identified image to the first user device based on a request from the first user device to view the third image.

11. A method comprising:

at a computing platform, the computing platform having at least one processor and memory:
receiving a first image, embedded with steganographic modifications comprising modifications to one or more bits of a plurality of pixels of the first image, wherein the steganographic modifications comprise malicious software;
generating a copy of the first image;
generating a safe first image of the copy of the first image by changing or modifying one or more less significant bits of at least one pixel of the copy of the first image, wherein generating the safe first image of the copy of the first image renders the steganographic modifications ineffective;
routing the safe first image to a first user device;
routing the first image to an isolation zone system;
automatically causing, at the isolation zone system through one or more commands directing the isolation zone system to execute the steganographic modifications of the first image, execution of the steganographic modifications of the first image; and
performing, based on results of the execution of the steganographic modifications of the first image in the isolation zone system, one or more security actions.

12. The method of claim 11, wherein the one or more security actions comprises:

flagging an outside source of the first image as malicious entity.

13. The method of claim 12, wherein embedding the first image with steganographic modifications comprises accessing a stored image at the computing platform, and modifying the stored image through steganography.

14. The method of claim 13, wherein embedding the first image with the steganographic modifications comprises directing the computing platform to store an image with the steganographic modifications.

15. The method of claim 11, further comprising:

receiving a second image;
routing the second image to the isolation zone system;
automatically causing, at the isolation zone system through one or more commands directing the isolation zone system to execute the second image, execution of the second image;
identifying, based on execution of the second image, whether or not the second image contains a second steganographic modification; and
based on identifying that the second image contains the second steganographic modification comprising malicious software:
generating a safe second image by changing or modifying one or more bits beginning from a least significant bit of at least one color component of a plurality of pixels of the second image, wherein generating the safe second image renders the second steganographic modifications of the second image ineffective, and
storing the safe second image rather than the second image.

16. The method of claim 11, wherein the steganographic modifications embedded in the first image comprise modifications to one or more color components of the plurality of pixels.

17. The method of claim 16, wherein the safe first image is generated by changing or modifying at least one of four bits beginning from a least significant bit of at least one color component of all pixels of the first image.

18. The method of claim 11, wherein the computing platform stores the safe first image rather than the first image.

19. The method of claim 11, wherein routing the safe first image to the first user device is in response to receiving a request to view the first image from the first user device.

20. One or more non-transitory computer-readable media storing instructions that, when executed by a computing platform comprising at least one processor, memory, and a communication interface, cause the computing platform to:

receive a first image, embedded with steganographic modifications comprising modifications to one or bits of a plurality of pixels of the first image, wherein the steganographic modifications comprise malicious software;
generate a copy of the first image;
generate a safe first image by changing or modifying one or more bits beginning from a least significant bit of at least one pixel of the copy of the first image, wherein generating the safe first image of the copy of the first image renders the steganographic modifications ineffective;
route the safe first image to a first user device
route the first image to an isolation zone system;
automatically cause, at the isolation zone system through one or more commands directing the isolation zone system to execute the steganographic modifications of the first image, execution of the steganographic modifications of the first image; and perform, based on results of the execution of the steganographic modifications of the first image in the isolation zone system, one or more security actions.

\* \* \* \* \*